W. A. CASWELL.
Hose-Coupling.

No. 199,349. Patented Jan. 22, 1878.

Witnesses
Forde R. Smith
M. E. Dayton

Wm. A. Caswell Inventor
By Munday & Evarts
Attorneys

UNITED STATES PATENT OFFICE.

WILLIAM A. CASWELL, OF CHICAGO, ILLINOIS, ASSIGNOR OF ONE-HALF HIS RIGHT TO E. B. PRESTON, OF SAME PLACE.

IMPROVEMENT IN HOSE-COUPLINGS.

Specification forming part of Letters Patent No. 199,349, dated January 22, 1878; application filed November 20, 1877.

*To all whom it may concern:*

Be it known that I, WILLIAM A. CASWELL, of Chicago, in the county of Cook and State of Illinois, have invented certain Improvements in Hose-Couplings, of which the following is a specification:

The invention relates more particularly to the means employed for securing the hose in those metal couplings the sections whereof are made of one solid piece of metal; and it consists in making the chamber in the metal coupling which is to receive the end of the hose of a conical form, tapering from a smaller to a larger diameter, the larger diameter of the cavity being at the interior end of the same, and in employing, in conjunction therewith, a metal thimble, swaged out to a similar cone, between which and the walls of the cavity the hose is held.

The advantages of this method are several, but chiefly consist in the fact that the cone shape offers a greater degree of resistance to the pulling out of the hose from the coupling under pressure. The more back pressure there is in the hose thus fastened the greater will be the resistance of the two concentric cones against the withdrawal of the hose.

The invention further consists in a peculiar packing or rubber cap-like ring, which I call the "rubber ring-cap," and which is slipped over the end of the hose, and folded over the raw edge of the end of the hose, so as to form a continuous rubber surface, extending for a short distance from the outside over the end and into the interior of the hose, whereby, when the hose thus capped is inserted in the cavity of the coupling and the inner plate or thimble swaged out against it, the end of the hose will be embedded in a continuous cushion of rubber, which will surround the end of the hose at all sides, to prevent wear or strain, and, what is more important, to prevent leakage, and particularly to prevent water from soaking into the cotton fabric in the interior of rubber hose, or upon the exterior thereof, and thus to guard against decay, to which such hose, as ordinarily constructed and used, is extremely liable at this point.

It also further consists in forming the swaged thimble at the base of the cone with a rounded contour—in other words, in giving it at the extreme inner end a slightly less diameter than it has at a point just in front or toward the middle of the thimble, whereby the water-way is rendered smoother, and an abrupt angle avoided.

Figure 1:
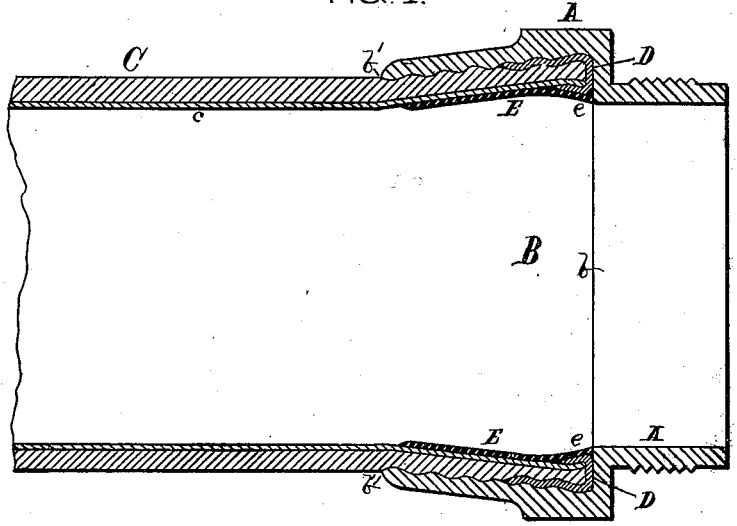
Figure 2:
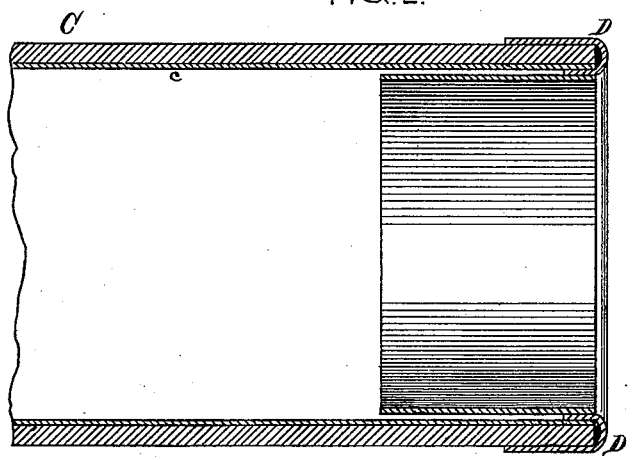

In the drawings, which form part of this specification, Figure 1 is a longitudinal section of a coupling and hose secured therein in accordance with my invention. Fig. 2 is a section of the hose provided with the cap and the thimble, ready to be inserted and secured in a coupling.

In said drawings, A is one of the parts of a hose-coupling. It is made with a chamber, B, in rear of the screw, which chamber is largest nearest the thread at the shoulder $b$, and tapers back toward the edge $b'$. The inner surface of this chamber or cavity may be corrugated, to afford a better hold to the hose.

C is the hose, in this case intended to represent "woven or fabric hose," as it is termed, lined interiorly with rubber $c$. D is the rubber ring-cap, folded over the inner and outer sides and the ends of the hose, as shown at Fig. 2. E is the thimble.

The hose, thimble, and cap, in the relative arrangement shown at Fig. 2, are inserted in the chamber B of the coupling, so that the end of the hose and the ring-cap, or rather the ring-cap on the end of the hose, rests against the shoulder $b$. An expanding-mandrel of proper form is then introduced, and the thimble is expanded to the form shown at Fig. 1, giving a firm pressure to the hose and the ring-cap, and forming at the same time the curved surface or water-way $e$, together with the water-tight joint.

It is not necessary that the ring-cap shall be molded into a form proper to fit the end of the hose. It is sufficient and much cheaper to employ a simple rubber band of such a width that by its elasticity it will permit folding to the proper shape. Ordinary large-sized stationer's bands of an inch or inch and a half in width, according to the size and thickness of the hose, may be used.

Having thus described my invention, I claim—

1. The section of the coupling for hose, made solid in one piece, and provided with the chamber which receives the hose, of a taper or conical form of largest diameter inside.

2. The coupling-section, made solid and in one piece, and having the tapered hose-chamber, and the hose, in combination with the thimble, which is inserted through the water-way, and then expanded to compress the hose within the chamber, substantially as shown.

3. The expanded thimble, expanded in tapering form with a recurve, $e$, to form a smooth water-way.

4. The combination of a coupling, a hose, a swaged thimble, and the rubber ring-cap.

W. A. CASWELL.

Witnesses:
EDW. S. EVARTS,
FORDE R. SMITH.